US00RE42511E

(19) United States
(12) Reissued Patent
Tremblay et al.

(10) Patent Number: US RE42,511 E
(45) Date of Reissued Patent: Jul. 5, 2011

(54) BONDED AGGREGATE COMPOSITION AND BINDERS FOR THE SAME

(75) Inventors: Jean Tremblay, Pinckney, MI (US); David Mintz, Boca Raton, FL (US); Neil Mintz, Boca Raton, FL (US)

(73) Assignee: Stellar Materials Incorporated, Sturgeon Bay, WI (US)

(21) Appl. No.: 10/938,497

(22) Filed: Sep. 10, 2004

Related U.S. Patent Documents

Reissue of:
(64) Patent No.: 6,447,596
Issued: Sep. 10, 2002
Appl. No.: 09/563,764
Filed: May 1, 2000

U.S. Applications:
(63) Continuation of application No. 09/280,608, filed on Mar. 29, 1999, now abandoned, which is a continuation-in-part of application No. 08/846,816, filed on Apr. 30, 1997, now Pat. No. 5,888,292, which is a continuation of application No. 08/703,837, filed on Aug. 27, 1996, now abandoned, which is a continuation of application No. 08/477,774, filed on Jun. 7, 1995, now abandoned, which is a continuation-in-part of application No. 08/253,613, filed on Jun. 3, 1994, now abandoned, which is a continuation of application No. 07/874,377, filed on Apr. 27, 1992, now abandoned.

(51) Int. Cl.
*C04B 12/02* (2006.01)
*C04B 7/32* (2006.01)

(52) U.S. Cl. ..... 106/691; 106/38.22; 106/38.27; 106/675; 106/676; 106/690; 106/692; 106/695; 106/698; 264/333

(58) Field of Classification Search ..... 106/38.22, 106/38.27, 675, 676, 690, 691, 692, 695, 106/698; 264/333
See application file for complete search history.

(56) References Cited

U.S. PATENT DOCUMENTS

| | | | | |
|---|---|---|---|---|
| 3,930,872 | A | 1/1976 | Toeniskoetter et al. | 106/38.3 |
| 3,966,482 | A | 6/1976 | Cassidy et al. | 106/64 |
| 4,066,471 | A | 1/1978 | Burke | 106/104 |
| 4,174,226 | A | 11/1979 | Fitzpatrick et al. | |
| 4,419,133 | A | 12/1983 | Shubow et al. | 106/675 |
| 4,522,651 | A | 6/1985 | Seeney et al. | 106/38.3 |
| 4,734,133 | A | 3/1988 | Sherif et al. | 106/85 |
| 4,737,192 | A | 4/1988 | Smith | 106/85 |
| 4,749,413 | A | 6/1988 | Tomic | 106/85 |
| 4,786,328 | A | 11/1988 | Weill et al. | 106/691 |
| 5,152,836 | A | 10/1992 | Hirano et al. | 106/690 |
| 5,279,665 | A | 1/1994 | Yunovich et al. | 106/691 |
| 5,382,289 | A | 1/1995 | Bambauer et al. | 106/691 |
| 5,888,292 | A | 3/1999 | Tremblay | 106/691 |
| 5,954,872 | A | 9/1999 | Benson | 106/691 |

FOREIGN PATENT DOCUMENTS

| | | | |
|---|---|---|---|
| GB | 1437808 | 6/1976 | 106/290 |
| JP | 38-7649 | 9/1963 | |
| JP | 5 7067 070 | 4/1982 | 106/690 |
| WO | WO 92/04293 | 3/1992 | |
| WO | WO 00/06519 | 2/2000 | |

OTHER PUBLICATIONS

Norton, "Refractories", 4th Edition, pp. 56-57 (1968) (no month).
Aliprandi, "Ceramurgia e tecnologia ceramica", parte VI, pp. 812-813 (1975) (with English translation) (no month).
Plibrico, "Technology of monolithic refractories", pp. 182-185 (1984) (no month).
American Ceramic Society, "New developments in monolithic refractories", vol. 3, pp. 31-32 (1985) (no month).
Alcoa, "Alcoa phosphate binders", (1988) (no month).
Ashland Chemicals, "Inoset® No-Bake Binder System", (1981) (Dec.).
Encyclopedia of Chemical technology, Kirk-Othmer, Thrid Edition, vol. 17 [no date].
C-E Minerals products, Tabular Alumina, http://www.ceminerals.com//t1064-.html, 2 pages [no date].
LaFarge Calcium Aluminates, Inc. Product Data Sheet Reference US Jan. 2006, Refractory applications, Secar 71 [no date].
Casting Technical Session, Thursday Afternoon, Dec. 31, 1959, pouring, refractories, gadgets and tricks,pp. 391-394.
Kerneous Aluminate Technologies, Product Data Sheet , Reference PDS-US-S80-8-06 Secar 80, updated Aug. 24, 2006, 2 pages.
Calcium aluminate cements, from wikipedia, the free encyclopedia, 3 pages [no date].
Scully, Scott, Murphy & Presser, PC. letter dated Jan. 7, 2009 , RE: U.S. Patent No. 6,447,596—Executive Summary, 7 pages.

*Primary Examiner* — Anthony J Green
(74) *Attorney, Agent, or Firm* — Gifford, Krass, Sprinkle, Anderson & Citkowski, P.C.

(57) ABSTRACT

Bonded aggregate compositions such as concrete, concrete repair products, high temperature refractories, high temperature insulation and fire resistant insulation are made from an aqueous solution of phosphoric acid and a separate, storable dry mixture of suitable aggregate, monocalcium phosphate, and calcium in the form of calcium aluminate cement or calcium oxide. The proportion of wet to dry constituents is variable so as to select the working time and strength of the aggregate composition, typically on the order of ten to fifteen minutes. The mixture of the preferred dry constituents, and the binder to be mixed with the aggregate to yield the preferred dry mixture, are also disclosed. The binder system is particularly advantageous in that the same set of binder constituents can readily be employed with a variety of aggregates, reducing the cost of providing a variety of aggregate compositions due to the ready availability of the raw materials and obviating the need to stock different binders for different aggregate compositions. Cost is additionally reduced through the use of less purified, and therefore less expensive constituents.

62 Claims, No Drawings

BONDED AGGREGATE COMPOSITION AND BINDERS FOR THE SAME

Matter enclosed in heavy brackets [ ] appears in the original patent but forms no part of this reissue specification; matter printed in italics indicates the additions made by reissue.

The present application is a continuation of 09/280,608 filed Mar. 29, 1999, abandoned which is a continuation-in-part of 08/846,816 filed Apr. 30, 1997, U.S Pat. No. 5,888,292, which is a continuation of 08/703,837 filed Aug. 27, 1996, abandoned which is a continuation of 08/477,774 filed Jun. 7, 1995, abandoned which is a continuation-in-part of 08/253,613 filed Jun. 3, 1994, abandoned which is a continuation of 07/874,377 filed Apr. 27, 1992 abandoned.

FIELD OF THE INVENTION

The present invention relates to bonded aggregate structures used primarily for high temperature applications. More particularly, the present invention relates to materials required to protect holding vessels containing both ferrous and non-ferrous metals, molten glass, and airborne high temperature environments such as boilers and furnaces of all kinds. The present invention further relates to the composition for forming such structures and binders for use in such compositions.

BACKGROUND OF THE INVENTION

Bonded aggregate compositions are a class of known materials useful for many purposes. The class includes such products as concrete repair materials, heat resistant floor materials, high temperature refractory materials, high temperature insulation materials, and fire resistant materials. Bonded aggregate compositions generally comprise a suitable aggregate (a filler which determines the structural characteristics of the compositions before and after heat up) bound by a binder such as a high temperature cement.

Conventional cements used for bonding aggregates include aluminous cements, hydraulic cements, and Portland cements. Hydraulic cements are mixtures of fine ground lime, alumina, and silica which set to a hard product upon admixture with water, the water combining chemically with the cement constituents to form a hydrate. Portland cements are particularly hydraulic cements composed of lime, alumina, silica, and iron oxide (as tetracalcium aluminoferrate), tricalcium aluminate, tricalcium silicate, and dicalcium silicate. Portland cements contain generally less than five percent alumina.

Aluminous cements, in contrast, are hydraulic cements which contain at least thirty to thirty-five percent alumina, which is usually applied by the inclusion of calcined bauxite.

The cement or binder is selected to match the particular use for which the bonded composition will be used and to match the particular aggregate employed, which is similarly chosen in view of the ultimate use of the bonded composition.

Binder systems based upon phosphates have been employed, but the use of such systems normally include phosphoric acid (or a salt thereof in the presence of water) in combination with an inorganic metal oxide such as magnesium oxide or alumina oxide. Two types of products can be formed from such systems: some experiencing high temperatures during setting while ultimately achieving a high p.s.i. strength and achieving a quick set of the product at ambient temperature (15 degrees F to 85 degrees F), and others having a controlled set by application of significant heat (200 degrees F to 500 degrees F) to bring about a final set. The major drawbacks of these systems are the short working times available for the ambient set formulations, which are typically on the order of one minute. While it is preferred in working with bonded aggregates of any type that the composition set fairly rapidly, a working time of at least three minutes and preferably a range of seven to ten minutes is most desirable. With controlled set the user is extremely limited as to where the materials can be used. Both of these compositions are very sensitive to impurity when exposed to temperatures above 2500 degrees F. This limits their use both from an economic as well as practical point of view.

SUMMARY OF THE INVENTION

Applicant has discovered that the problems of the control of the setting speed of the aggregate composition. the sensitivity of the composition to impurities and the additional costs associated with providing a variety of binders for different aggregates can all be overcome by the use of a binder system comprising at least one phosphate-providing component which is in a liquid phase at ambient temperature and pressure, and at least one dry component containing CaO, $Al_2O_3$, $SiO_2$, and $Fe_2O_3$. In one embodiment, the dry component comprises a calcium-providing component, a magnesium-providing component, or mixtures thereof. The binder may, but does not have to contain, a dry phosphate-providing component. In one embodiment, a dry phosphate-providing component and a calcium-providing component are preferably contained in a single material such as hydrated monocalcium phosphate (Ca $H_2PO_4$ $H_2O$). However, although these two components are contained in a single material in this embodiment, an additional calcium-providing material (such as calcium aluminate cement, calcium oxide, or mixtures of them) is preferred.

Strength and dimensional characteristics can be controlled by selectively varying the concentration and ratio of the wet and dry components. The invention permits the use of commercial or preferably agricultural grade materials having lower cost than the highly purified constituents presently required in other systems. This invention does not have as a requirement the use of technical grade components, in particular technical grade phosphoric acid, as is required in other systems.

The invention is also directed to an admixture of only the dry binder components, wherein the binder is mixed with the aggregate and the wet phosphate-providing component at a remote location or where the bound aggregate structure is to be formed.

A basis for bonding in one preferred system is believed to be the admixture of a calcium-providing component such as a calcium aluminate with a wet phosphate-providing constituent such as a dilute phosphoric acid. Applicant has found that the optional addition of a dry phosphate-providing component to the basic binder not only varies the setting time by a controllable amount, but varying the percentage strengths of the aqueous phosphates to the percentage strengths of the dry phosphates, also alters the strengths and refractory characteristics of the aggregate structures after they are heated.

The binder of the present invention can typically be employed with a variety of aggregate structures, such as refractory structures, high temperature insulation structures, ambient temperature structures such as regular floor and road applications, fire resistant structures, as well as a repair material for these high-and ambient-temperature structures. One particularly useful ambient temperature application involves the use of this system for the overall containment and neutralization of harmful liquid wastes, such as radioactive wastes. For example, the binder of the present invention can be used in conjunction with a phosphate-containing aggregate to both neutralize the waste, as well as contain it, either by hardening the waste itself or "walling" it in. In this way, environmental seepage of the harmful waste is avoided.

The optional dry phosphate-providing component of the present invention preferably also contains a calcium-providing component in a single material such as monocalcium phosphate, while the wet phosphate-providing component is typically a phosphoric acid solution, preferably an agricultural grade solution. In one embodiment, an additional calcium-providing component is included in the binder, thus the additional calcium-providing component usually comprises either a calcium aluminate cement or calcium oxide or a mixture of these materials.

The dry aggregate composition in accordance with the present invention typically comprises between fifty and ninety-five percent by weight of the aggregate, one to twenty-five percent by weight of a dry component containing CaO, $Al_2O_3$, $SiO_2$, and $Fe_2O_3$ and zero to fifty percent by weight of the dry phosphate-providing component. Such a dry aggregate composition can be admixed with about five to eighty-five percent by weight of a wet phosphate-providing component, such as a solution of commercially available phosphoric acid solution.

The present invention is thus not only directed to the bonded aggregate composition or structure, but is also directed to a dry binder comprising a mixture of the optional dry phosphate component, the wet phosphate component and the calcium component, and also to a dry aggregate composition useful for forming an aggregate structure upon the addition of a wet phosphate component. In this situation, the dry aggregate composition comprises an aggregate, an optional dry phosphate component and a dry calcium and/or magnesium component. The invention is also directed to a method of forming a bonded aggregate structure comprising the steps of mixing a wet phosphorous-providing component with the dry aggregate composition, forming the admixture into an appropriate shape, and allowing the admixture to set.

As noted, the specific proportions of components optimal for a particular purpose can readily be selected on a trial-and-error basis, but in any event are selected so as to be adequate to achieve a bonded aggregate composition of adequate strength and utility after admixture and working. It is believed, however, that the wet-to-dry ratios are governed by the structural requirements of the finished, cured aggregate structure. Generally a lower wet-to-dry ratio will be expected to result in a bonded aggregate structure of higher strengths and stability. Dilution of the aqueous phosphate while increasing the proportion of, for example, dry phosphate and calcium aluminate, is expected to yield materials having high strengths in a lower temperature range (1200 F to 2200 F), but suffering structural failure above that range. Increasing the phosphate content in the aqueous component while simultaneously decreasing the proportions of, for example, dry phosphate and calcium aluminate, is expected to yield materials having high strengths in a higher temperature range (2200 F-3100 F) and to simultaneously extend the limit of structural failure to a higher temperature.

DETAILED DESCRIPTION OF THE PREFERRED EMBODIMENTS

A better understanding of the present invention will now be had upon reference to the following detailed examples falling within the scope of the appended claims. A bonded aggregate structure according to the present invention is generally formed by the admixture of a phosphate-providing component which is in a liquid phase at ambient temperature and pressure, with a previously constituted admixture of dry components including an aggregate, and a component containing an element selected from the group consisting of Group IIA elements, preferably a calcium- or magnesium-providing component or a mixture thereof. In one embodiment, calcium aluminate cement is utilized. Finally, an optional dry phosphate providing component may be added to the dry components. The proportions of these components in various compositions are set forth in the following examples.

The wet phosphate-providing component is preferably a dilute solution of agricultural grade phosphoric acid or orthophosphoric acid, although commercial, industrial and technical grades can also be used. The wet phosphate-providing component is added in an amount adequate to render the admixture workable yet also adequate to provide a sufficient phosphate content to permit rapid setting, on the order of 8 to 30 minutes at 70 degrees F such that the admixture can be applied to a mold or shaped to form a bound aggregate structure. Molds can be constructed of materials such as steel, wood, foam, plastic and combinations thereof The bound aggregate structure can be removed from mold after if after it has set. An aggregate can be readily formed from batches of the aggregate and dry component mixture, mixed with an appropriate amount of phosphoric acid solution.

A wet phosphate-providing component especially useful for refractory or high temperature insulation aggregates is shown in the examples and was prepared as a 1:1 to 4:1 dilution (water:acid) of TG-434, an orthophosphoric acid of $H_3PO_4$ available from PCS Sales, Inc., Aurora, N.C. A typical composition for TG-434 is:

| | |
|---|---|
| $H_3PO_4$ | 77.73% |
| Solids | 0.1% |
| Iron as $Fe_2O_3$ | 1.3% |
| Aluminum as $Al_2O_3$ | 0.6% |
| Magnesium as MgO | 1.3% |
| Fluoride as F | 0.5% |
| Sulphate as $SO_4$ | 0.8% |
| Calcium as CaO | 0.2% |
| Arsenic as As | 0.5 ppm |
| Organic Carbon as TOC | 55.0 ppm |
| $H_2O$ | Balance |

TG-434 is a light green liquid having a specific gravity of 1.71 and an apparent Brookfield viscosity of 150 centipoise at 75 degrees F. Its freezing point at a concentration of 56.3% $P_2O_5$ is below −20 degrees F.

The aqueous or wet phosphate-providing component can alternatively be any liquid phosphate which is capable of providing dimensional and structural stability to the bonded aggregate structure when exposed to elevated temperature up to 3,400 degrees F. This component can also be packaged to include aggregate disposed therein.

The optional dry phosphate-providing component can be any material containing a water soluble phosphate in a concentration adequate to react with the calcium- or magnesium-providing component to provide an adequate bond to the aggregate structure.

The preferred dry phosphate-providing component is monocalcium phosphate or triple superphosphate of formula $Ca(H_2PO_4)_2\ H_2O$ sold as C-38 from PCS Sales, Inc., Aurora, N.C. A typical composition for C-38 is:

| | |
|---|---|
| $P_2O_5$ | 67.1% |
| Calcium. as CaO | 20.9% |
| Fluoride compounds as F | 1.7% |
| $Al_2O_3$ | 0.40% |
| $SiO_2$ | 1.7% |
| $Fe_2O_3$ | 1.8% |
| MgO | 2.0% |
| $SO_4$ | 3.0% |

The advantage in using a monocalcium phosphate is that you are combining both a phosphate providing component and a calcium providing component in one material. C-38 is an odorless, gray, granular solid having a specific gravity between 1.1 and 1.2 and possessing a melting point of 230 degrees F. A 1 % suspension in water has a pH of between about 2.5 to 2.8.

The additional calcium- or magnesium-providing component can be any material capable of providing supplemental calcium or magnesium to react with the phosphate components in order to provide adequate bonding in the aggregate structure. A dry calcium binder component can include the compounds of CaO, $Al_2O_3$, $SiO_2$, and $Fe_2O_3$. Calcium aluminate cements such as Secar, Lumnite, Refcon CaO $Al_2O_3$, CaO $Al_2O_3$ $Fe_2O_3$, CaO $Al_2O_3$ $SiO_2$, or CaO $Al_2O_3$ $SO_4$ are preferred materials, as well as long-working calcium aluminate cements (to extend both the working time and the setting time) and magnesium oxides.

A particularly preferred additional calcium-providing material is the calcium aluminate cement sold under the name Refcon™ by the Lehigh Cement Company in Allentown, Pennsylvania. Refcon is formed by sintering a pelletized, solid mixture of bauxite and limestone. A typical composition comprises:

| | |
|---|---|
| $Al_2O_3$ & $TiO_2$ | 57.40% |
| Total Iron as $Fe_2O_3$ | 1.20% |
| CaO | 34.20% |
| $SiO_2$ | 5.70% |
| $SO_3$ | 0.36% |

Refcon typically has a bulk density of about 1500 kg/m3 and a specific gravity of 3.02. It possesses a blaine specific surface of 3300 cm2/g. It has a one day compressive strength of 6500 psi when measured by A.S.T.M. C-109. A preferred magnesium-containing component is Mag-Chem 10-40, a compound containing primarily MgO.

The $Al_2O_3$ fraction of the dry component is preferably at least one percent and preferably ranges from approximately 1% to approximately 85% by weight. The CaO fraction of the dry component is preferably at least one-quarter of a percent, by weight.

It should be noted that when monocalcium phosphate is used as a single source for both the dry phosphate and dry calcium-providing component, it appears that it is necessary to include the additional calcium-providing material mentioned above to achieve adequate bonding to provide dimensional and structural stability to the bonded aggregate structure when exposed to elevated temperatures of up to 3400 F.

As can be seen from the compositions of these materials, the present invention is advantageous in that it permits satisfactory bound aggregate structures to be formed quickly (8 to 30 minutes with adequate working time (10 minutes or more at 70 F) and be able to withstand temperatures up to 3400 F using commercial and agricultural grade materials, including particularly a phosphoric acid such as TG-434, preferably diluted. Bound aggregate structures can be formed by applying the binder component and aggregate to a mold, allowing the bound aggregate structure to set, and removing the bound aggregate structure from the mold. This method can be used to line or form heat-containing vessels such as kilns, cement kilns, lime kilns, kaolin kilns, furnaces, and incinerators. Examples of furnaces specific for the petrochemical industry include fluidized catalytic craking unit or cat cracker (FCCU) cyclones, sulfur reactors, ethylene crackers, and coke calciners. The method and bound aggregate can also be used to line or form vessels for containing amorphous materials such as molten metals including aluminum, steel, copper, brass, bronze, magnesium, iron and lead. Other products which can be constructed by the methods from the bound aggregate of the present invention include burner tiles and blocks, thermocouple sleeves and molten material conveying devices such as stock tubes and launders and troughs.

The invention is also advantageous in that the binder incorporating the preferred materials described above can be used with a variety of aggregates for different structural purposes. The binder of the present invention can be employed with refractory aggregates, high temperature insulation aggregates, and ambient temperature aggregates used in ambient applications.

For example, typical aggregates useful for forming a bonded aggregate structure in accordance with the present invention include at least one of the following: flint clay, mulcoa, kyanite, mullite, chromite, tabular alumina, silicon oxide, silica, calcined bauxite, chrome oxide, zirconia, phosphate rock, and mixtures thereof. It is believed that some amount of aluminum-containing material is necessary for any dense refractory aggregate structure in order to achieve adequate bonding and maintain dimensional and structural stability when exposed to elevated temperatures.

The preferred refractory aggregates include flint clay; Mulcoa 47, 50, 60, 70, and 90:. kyanite; mullites; chrome ore; bauxite; tabular alumina; and mixtures thereof. For alumina based systems, as the intended temperature of use of the refractory increases, the aluminum content of the aggregate generally increase as well.

An aggregate useful in the present invention to be used as an expandable high temperature insulation may be selected from at least one of: silica sand #140, mullite #200, kyanite #325, tabular alumina #200, dolomitic lime, and talc. A preferred aggregate for expandable insulation comprises a mixture of silica sand #140, dolomitic lime, and talc. The talc controls the size of the bubbles of carbon dioxide released during expansion and therefore allows the pores in the expanded insulation to be uniform in size. A particularly useful aggregate for an ambient temperature application involving use of this system to contain/solidify/neutralize liquid waste material (i.e., radioactive waste material) is phosphate-containing aggregates, preferably phosphate rock (sold as C-31 Phos-Rock by PCS Sales, Inc., Aurora, N.C.).

The chemical composition of these aggregates is well known to those skilled in this art. Mulcoa, flint clays, and kyanites are comprised of, in major part, aluminum (III) oxide, silica dioxide (that is, silicon tetroxide). Chrome ore is comprised of, in major part, chromium (III) oxide, aluminum oxide, and magnesium oxide. Tabular alumina is comprised substantially of pure aluminum (III) oxide. White sand is comprised of, in major part, silicon dioxide. Lime consists in major part of calcium oxide. White dolomitic lime is a mixture of lime and dolomite (calcium magnesium bicarbonate). Talc is a natural foliated hydrous magnesium silicate.

This list of aggregates which can be bound by the binder of the present invention is not intended to be an exhaustive list of aggregates useful in the present invention, but represent testing and conclusions brought about by using them. Because of the versatility of the binder system, it is expected that many other aggregates may be bound by the binder system of the present invention and be used for form useful bound aggregate structures. Which aggregate to use will be chosen in accordance with the end use requirements of the bound structure and the purity of the product needed.

As shown in the following example, a dry aggregate composition in accordance with the present invention can be formed from a mixture of about 50-95 percent by weight of a suitable aggregate, 1-20 percent by weight of a dry calcium- and/or magnesium-providing component, and 0-50 percent by weight of a dry phosphate-providing component; and in one embodiment, from a mixture including 1-30 percent by weight of a single material providing both of the phosphate- and calcium-providing components, as well as an additional calcium component.

Thereafter, depending upon the type of bound aggregate structure that is desired, from about 5-85 percent by weight of a wet phosphate-providing component is admixed with the dry aggregate composition. For a refractory structure, between 10 and 30 percent by weight of the wet component will typically be employed. However, if it is desired that the admixed materials be expandable or pumped into the location of use (for example, if they are used as an expandable insulation or a pumpable high temperature insulation) more of the wet component will be employed, for example, preferable between 30 and 60 percent by weight.

Table I recites Examples #1 through #15 which define refractory compositions falling within the scope of the present invention. Table II recites the chemical analyses of the various components. The compressive strength (psi) and linear re-heat change were measured in accordance with prevailing A.S.T.M standards. (For example, A.S.T.M. C-133-84—Cold Crushing Strength and Modulus of Rupture of Refractory Bricks and Shapes and A.S.T.M. C-113-74—Reheat Change of Refractory Brick). Samples were prepared for such testing by pouring 2.5 kg increments of the blended aggregate and binder mixture into an appropriate volume of aqueous phosphate solution and hand-mixing with a two inch trowel until the mixture is completely wetted out (typically for approximately one minute) and then depositing the mixture into appropriately dimensioned molds.

TABLE I

| | EXAMPLE 1 % | EXAMPLE 2% | EXAMPLE 3 % | EXAMPLE 4% | EXAMPLE 5% | EXAMPLE 6% | EXAMPLE 7% | EXAMPLE 8% | EXAMPLE 9% |
|---|---|---|---|---|---|---|---|---|---|
| SAMPLE FORMULATIONS | | | | | | | | | |
| Dry | | | | | | | | | |
| ALCOA A-12 | | | | | 18.44% | | | 2% | |
| ALUMINA | | | | | | | | | |
| BAUXITE 8X20 | | | | | | 59.90% | | | |
| CAREY | | | | | | | 4.00% | | |
| MICROFINE | | | | | | | | | |
| DOLOMITE | | | | | | | | | |
| CERAMITALC #1 | | | | | | | 4.00% | | |
| CHROME SAND | | | | | | | | | 90.00% |
| FLINT CLAY | 50.15% | 50.15% | | | | | | | |
| FUSED SILICA | | | | | | | | | |
| KYANITE 100 | 23.39% | | | | | | | | |
| MAG CHEM 10-40 | | | | | | | | | |
| MULCOA 47-4 | | | 50.15% | 70.20% | | | | | |
| MULCOA 60-8X0 | | | | | 73.76% | | | | |
| MULCOA 90 | | | | | | | | 60.00% | |
| MULLITE #200 | | 23.39% | 23.39% | 20.05% | | | | | |
| REFCON | 6.41% | 6.41% | 6.41% | 6.41% | 5.90% | 5.90% | 14.00% | 5.00% | 7.00% |
| SILICA 140 | | | | | | | 68.00% | | |
| TAB ALUM 8x0 | | | | | | 13.83% | | 13.00% | |
| TG C-38 | 20.05% | 20.05% | 20.05% | 3.34% | 1.90% | 1.90% | 10.00% | 2.00% | 3.00% |
| TOTAL DRY | 100.00% | 100.00% | 100.00% | 100.00% | 100.00% | 100.00% | 100.00% | 100.00% | 100.00% |
| LIQUID | | | | | | | | | |
| TG 434 1:4 | 13.00% | 13.00% | 13.00% | | | | | | |
| TG 434 1:3 | | | | | | | 40.00% | | |
| TG 434 | | | | | | | | | |
| TG 434 1:1 | | | | 17.00% | 14.00% | 15.00% | | 13.00% | 14.00% |
| PHYSICAL DATA | | | | | | | | | |
| Cold Crushing | | | | | | | | | |
| ampere / ambient | | | | | | | | | |
| 1000 / 538 | | 3750 | 6000 | 6000 | 4000 | | | | |
| 1500 / 816 | 4500 | 4200 | 4000 | | | | | | |
| 2000 / 1093 | 2625 | 2900 | 2500 | 2000 | | | | | |
| 2200 / 1204 | 4000 | 4300 | 3900 | 1375 | 7000 | 5000 | | | |
| 2400 / 1316 | | | | 6000 | 4500 | 7500 | | 7666 | |
| 2600 / 1427 | | | | 7000 | 9000 | 11500 | | 5487 | |
| 2800 / 1538 | | | | | 9000 | 12500 | | 6462 | |
| 3000 / 1649 | | | | | 6000 | 21500 | 800 | 10110 | 13125 |
| 3100 / 1704 | | | | | 8125 | | | 11925 | 11900 |

TABLE I-continued

| LINEAR REHEAT SHRINKAGE | | | | | | | | | | |
|---|---|---|---|---|---|---|---|---|---|---|
| 1000 | 538 | −0.10% | −0.10% | | −0.20% | | | | | |
| 1500 | 816 | −0.50% | −0.42% | | −0.30% | | | | | |
| 2000 | 1093 | −1.00% | −0.89% | | −0.50% | 0.36% | | | | |
| 2200 | 1204 | | | | | −0.29% | | | −0.372% | |
| 2400 | 1316 | | | | −0.90% | | | | −0.775% | |
| 2600 | 1427 | | | | | | | | 1.34% | |
| 2800 | 1538 | | | | | | | | −1.69% | |
| 3000 | 1649 | | | | | | | | 1.10% | |
| SET TIME (Minutes) | | 8-15 | 8-15 | 8-15 | 8-15 | 8-15 | 8-15 | 8-15 | 8-20 | 8-15 |

| | EXAMPLE 10% | EXAMPLE 11% | EXAMPLE 12% | EXAMPLE 13% | EXAMPLE 14% | EXAMPLE 15% | EXAMPLE 16% | EXAMPLE 17 % |
|---|---|---|---|---|---|---|---|---|
| SAMPLE FORMULATIONS | | | | | | | | |
| Dry | | | | | | | | |
| ALCOA A-12 | 18.4% | 20.34% | 20.00% | | 18.4% | 20.34% | | |
| ALUMINA | | | | | | | | |
| BAUXITE 8X20 | 59.90% | | | | 59.90% | | | |
| CAREY MICROFINE | | | | | | | | |
| DOLOMITE | | | | | | | | |
| CERAMITALC #1 | | | | | | | | |
| CHROME SAND | | | | 93.00% | | | | |
| FLINT CLAY | | | | | | | | |
| FUSED SILICA | | | | | | | | 93.00% |
| KYANITE 100 | | | | | | | | |
| MAG CHEM 10-40 | | | | | 2.90% | 2.90% | 5.00% | 2.00% |
| MULCOA 47-4 | | | | | | | | |
| MULCOA 60-8X0 | | 73.76% | | | | 73.76% | | |
| MULCOA 90 | | | 60.00% | | | | | |
| MULLITE #200 | | | | | | | | |
| REFCON | 5.90% | 5.90% | 5.00% | 7.00% | 3.00% | 3.00% | | 3.00% |
| SILICA 140 | | | | | | | | |
| TAB ALUM 8x0 | 15.73% | | 15.00% | | 15.73% | | 95.00% | |
| TG C-38 | | | | | | | | 2.00% |
| TOTAL DRY | 100.00% | 100.00% | 100.00% | 100.00% | 100.00% | 100.00% | 100.00% | 100.00% |
| LIQUID | | | | | | | | |
| TG 434 1:4 | | | | | | | | |
| TG 434 1:3 | | | | | | | | |
| TG 434 | | | | | | | | |
| TG 434 1:1 | 15.00% | 13.00% | 13.00% | 14.00% | 15.00% | 13.00% | 19.00% | 19.00% |
| PHYSICAL DATA | | | | | | | | |
| Cold Crushing | | | | | | | | |
| ampere / ambient | | | | | | | | |
| 1000 / 538 | | 3850 | | | | 4200 | 6000 | 2000 |
| 1500 / 816 | | | | | | | | |
| 2000 / 1093 | | | | | | | 3500 | 3000 |
| 2200 / 1204 | 5250 | 6800 | | | 5000 | 7500 | 4000 | 3000 |
| 2400 / 1316 | 7280 | 4350 | 7200 | | 7800 | 4550 | | |
| 2600 / 1427 | 11000 | 9500 | 5750 | | 11800 | 8500 | | 3000 |
| 2800 / 1538 | 14000 | 10500 | 6565 | | 13250 | 9000 | | |
| 3000 / 1649 | 22500 | 5800 | 9800 | 12850 | 21500 | 5250 | | |
| 3100 / 1704 | | 8500 | 12500 | 12550 | | 8250 | 8000 | |
| LINEAR REHEAT SHRINKAGE | | | | | | | | |
| 1000 / 538 | | | | | | | | |
| 1500 / 816 | | | | | | | −0. 10% | −0.30% |
| 2000 / 1093 | | −0.40% | | | | −0.42% | | −0.50% |
| 2200 / 1204 | | −0.25% | −0.300% | | | −0.33% | | |
| 2400 / 1316 | | | −0.500% | | | | | |
| 2600 / 1427 | | | −1.00% | | | | −0.30% | −0.70% |
| 2800 / 1538 | | | −1.50% | | | | | |
| 3000 / 1649 | | | −8.50% | | | | −0.50% | |
| SET TIME (Minutes) | 8-15 | 8-15 | 8-20 | 8-20 | 8-20 | 8-20 | 8-20 | 8-20 |

TABLE II

CHEMICAL ANALYSES OF SAMPLE FORMULATIONS

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| Al2O3 | 35.61% | 36.25% | 37.12% | 42.24% | 57.51% | 78.14% | 6.00 | 79.75% | 17.16% |
| SiO2 | 16.87% | 16.29% | 30.36% | 36.35% | 24.48% | 2.16% | 50.99% | 2.16% | 1.89% |
| TiO2 | 0.31% | 0.29% | 1.05% | 1.30% | 1.37% | 2.23% | 0.01% | 2.27% | |
| Fe2O3 | 0.60% | 0.63% | 0.96% | 0.90% | 0.86% | 0.94% | 0.28% | 0.94% | 0.71% |
| CaO | 5.67% | 5.68% | 5.69% | 2.52% | 2.17% | 2.13% | 5.16% | 1.91% | 12.77% |
| MgO | 0.39% | 0.39% | 0.43% | 0.23% | 0.18% | 0.14% | 1.11% | 0.13% | 0.74% |
| Na2O | 0.13% | 0.13% | 0.04% | 0.05% | 0.08% | 0.05% | 0.01% | 0.05% | 0.05% |
| K2O | | | 0.04% | 0.05% | 0.03% | | | | |
| P2O5 | 11.95% | 11.96% | 11.99% | 1.97% | 1.18% | 1.11% | 4.82% | 1.19% | 8.46% |
| S | | | | | | | 0.00% | | |
| MnO | | | | | | | 0.00% | | |
| MgCO3 | | | | | | | 1.29% | | |
| CaCO3 | | | | | | | 1.57% | | |
| R2O3 | | | | | | | | | |
| SO3 | 0.02% | 0.02% | 0.02% | 0.02% | 0.02% | 0.02% | 0.04% | 0.02% | 0.11% |
| F | 0.31% | 0.32% | 0.31% | 0.09% | 0.07% | 0.07% | 0.17% | 0.07% | 0.40% |
| SO4 | 0.55% | 0.55% | 0.55% | 0.16% | 0.11% | 0.12% | 0.30% | 0.11% | 0.68% |
| H3PO4 | 1.89% | 1.89% | 1.89% | 7.15% | 6.04% | 6.44% | 8.13% | 5.68% | 28.90% |
| Zr2O3 | 16.04% | 16.05% | | | | | | | |
| ALKALIES | 0.09% | | | | | 0.17% | | 0.18% | |
| Free Water | 9.54% | 9.55% | 9.54% | 6.97% | 5.89 | 6.28% | 20.11% | 5.54% | 28.19% |

| | EXAMPLE 10 | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|---|
| Al2O3 | 79.77% | 59.68% | 81.50% | 19.54% | 78.27% | 58.17% | 83.81% | 1.60% |
| SiO2 | 2.13% | 24.67% | 2.13% | 1.91% | 1.99% | 24.51% | 0.03% | 82.26% |
| TiO2 | 2.13% | 1.38% | 2.27% | | 2.22% | 1.38% | | |
| Fe2O3 | 0.91% | 0.83% | 0.91% | 0.55% | 0.91% | 0.84% | 0.19% | 0.17% |
| CaO | 1.79% | 1.84% | 1.54% | 11.57% | 0.94% | 0.98% | 0.09% | 1.32% |
| MgO | 0.11% | 0.14% | 0.10% | 0.55% | 2.60% | 2.66% | 4.49% | 1.91% |
| Na2O | | 0.09% | 0.06% | | 0.05% | 0.09% | 0.10% | |
| K2O | | 0.03% | | | | 0.03% | | |
| P2O5 | | 0.07% | | | | 0.07% | | 1.19% |
| S | | | | | | | | |
| MnO | | | | | | | | |
| MeCO3 | | | | | | | | |
| CaCO3 | | | | | | | | |
| R2O3 | | | | | 0.01% | 0.01% | 0.02% | 0.01% |
| SO3 | 0.02% | 0.02% | 0.02% | 0.12% | 0.01% | 0.01% | 0.00% | 0.01% |
| F | 0.04% | 0.04% | 0.04% | 0.21% | 0.04% | 0.04% | 0.05% | 0.08% |
| SO4 | 0.07% | 0.06% | 0.06% | 0.34% | 0.07% | 0.06% | 0.09% | 0.14% |
| H3PO4 | 6.44% | 5.66% | 5.68% | 33.01% | 6.44% | 5.65% | 8.26% | 8.26% |
| Zr2O3 | | | | | | | | |
| ALKALIES | 0.17% | | 0.18% | | 0.17% | | | |
| Free Water | 6.28% | 5.52% | 5.54% | 32.19% | 6.28% | 5.51% | 8.06% | 8.06% |

It can be seen from the examples in Table I that the binder system of the present invention is useful for forming a variety of different refractory materials of different utilities from a single binder system. The proportions in the table are adjustable to optimize the resulting aggregate structures, depending upon intended use.

The present invention thus provides a method for forming a bonded aggregate, as well as providing a binder system for such bonded aggregate structures, a dry aggregate composition incorporating the dry constituents of the binder system, and a mixture of dry constituents needed in making the binder system. The present invention is advantageous over prior binder systems in that the constituents of the binder system can be commercial and agricultural grade materials, which have not been highly refined or purified. The dry binder components allow for the use of significantly less expensive aqueous phosphate solutions, and yet provide a bonded aggregate structure that is significantly better in refractory applications than is presently enjoyed by other known bonded aggregate structures for similar applications.

Moreover, the present invention advantageously reduces the expense of providing a variety of aggregate structures, because a single binder system can be employed to bind a wide variety of aggregates. The invention reduces the cost of supplying, manufacturing, or keeping in inventory different binder constituents.

With the refractory aggregate composition of the present invention using silica and other readily available refractory aggregates, the resulting aggregate structures possess significantly improved refractory characteristics over prior art structures in that the resulting structures are less susceptible to thermal shock, and in many cases, the structures do not need to be pre-dried or pre-fired after their initial set before being used at high temperatures. In addition, in field testing, the resultant structures proved to be extremely non-wetting to a variety of molten metals (both ferrous and non-ferrous) thus providing the end user with a low-maintenance refractory lining throughout its useful life.

Furthermore, the use of calcium (either alone or in combination with magnesium) as the divalent binder permits the refractory characteristics to depend upon the proportion and concentration of the wet and dry phosphate-providing components, specifically a selection of the temperature range in which optional refractory characteristics are obtained. Such selectivity is absent in mono-aluminum phosphate and magnesium phosphate-based systems.

In view of the teaching presented herein, other modifications and variations of the present inventions will be readily apparent to those of skill in the art. The foregoing discussion, and description are illustrative of some embodiments of the present invention, but are not meant to be limitations on the practice thereof. It is the following claims, including all equivalents, which define the scope of the invention.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed:

[1. A binder useful for bonding an aggregate into a rigid structure upon mixing and setting of said binder and said aggregate, said binder comprising:

an acidic phosphate-providing component, said component being in a liquid phase at ambient temperature and pressure; and a dry component comprising CaO, $Al_2O_3$, $SiO_2$, and $Fe_2O_3$ in proportions adequate to allow working upon mixing of said binder and said aggregate and adequate to yield a rigid structure upon setting of said mixed binder and aggregate, wherein said $Fe_2O_3$ comprises between 0.8 and 1.0 percent by weight of said binder.]

[2. The binder of claim 1, wherein the acidic phosphate component comprises a phosphoric acid.]

[3. The binder of claim 1, wherein the acidic phosphate component comprises orthophosphoric acid.]

[4. The binder of claim 1, wherein said dry component comprises at least 0.25 percent by weight of said CaO.]

[5. A bondable aggregate composition comprising:

an aggregate; and a binder, said binder comprising:

an acidic phosphate-providing component, said component being in a liquid phase at ambient temperature and pressure; and a dry component comprising CaO,$Al_2O_3$,$SiO_2$, and $Fe_2O_3$ in proportions adequate to allow working upon mixing of said binder and said aggregate and adequate to yield a rigid structure upon setting of said mixed binder and aggregate, wherein said $Fe_2O_3$ comprises between 0.8 and 1.0 percent by weight of said binder.]

[6. The bondable aggregate of claim 5, wherein said acidic phosphate component comprises a phosphoric acid.]

[7. The bondable aggregate of claim 5, wherein said acidic phosphate component comprises orthophosphoric acid.]

[8. The bondable aggregate composition of claim 5 further comprising a porosity-providing component, said component comprising low melting point particles dispersed evenly throughout said composition.]

[9. A method for forming a bonded aggregate structure, said method comprising the steps of:

admixing a wet or aqueous phosphate-providing component with a dry aggregate composition to form a mixture, said dry aggregate composition containing an aggregate and a binder component, said binder component comprising CaO,$Al_2O_3$,$SiO_2$, and $Fe_2O_3$ in proportions adequate to yield a settable mixture, wherein said $Fe_2O_3$ comprises between 0.8 and 1.0 percent by weight of said mixture; and allowing said mixture to set.]

[10. The method of claim 9, wherein phosphate-providing component comprises a phosphoric acid.]

[11. The method of claim 9, wherein phosphate-providing component comprises orthophosphoric acid.]

[12. The method of claim 9 further comprising applying said mixture into a mold during or after said admixing step in order to form a bonded aggregate structure.]

[13. The method of claim 12 further comprising removing said bonded aggregate structure from said mold after said setting step.]

[14. The method of claim 12, wherein said mold comprises a compound selected from the group consisting of steel, wood, foam, or plastic.]

[15. The method of claim 9 and further comprising applying said mixture onto a heat-containing vessel during or after said admixing step in order to line said vessel.]

[16. The method of claim 15, wherein the heat-containing vessel is an incinerator.]

[17. The method of claim, 15, wherein the heat-containing vessel is a kiln.]

[18. The method of claim 15, wherein the heat-containing vessel is a cement kiln.]

[19. The method of claim 15, wherein the heat-containing vessel is a line kiln.]

[20. The method of claim 15, wherein the heat-containing vessel is a kaolin kiln.]

[21. The method of claim 13, wherein the heat-containing vessel is a furnace.]

[22. The method of claim 21, wherein the furnace is a fluidized catalytic cracking unit.]

[23. The method of claim 21, wherein the furnace is a sulfur reactor.]

[24. The method of claim 21, wherein the furnace is an ethylene cracker.]

[25. The method of claim 21, wherein the furnace is a coke calciner.]

[26. The method of claim 9 further comprising applying said mixture into a vessel for containing an amorphous material during or after said admixing step in order to contain said amorphous material.]

[27. The method of claim 26, wherein said amorphous material comprises a molten metal.]

[28. The method of claim 27, wherein the metal comprises aluminum.]

[29. The method of claim 27, wherein the metal comprises steel.]

[30. The method of claim 27, wherein the metal comprises copper.]

[31. The method of claim 27, wherein the metal comprises iron.]

[32. The method of claim 22, wherein the metal comprises brass.]

[33. The method of claim 22, wherein the metal comprises bronze.]

[34. The method of claim 27, wherein the metal comprises magnesium.]

[35. The method of claim 27, wherein the metal comprises lead.]

[36. The method of claim 12, wherein the bonded aggregate structure is a burner tile or block.]

[37. The method of claim 12, wherein the bonded aggregate structure is a thermocouple sleeve.]

[38. The method of claim 12, wherein the bonded aggregate structure can convey a molten material therein.]

[39. A binder useful for bonding an aggregate into a rigid structure upon mixing and setting of said binder said aggregate, said binder comprising:

an acidic phosphate-providing component, said component being in a liquid phase at ambient temperature and pressure; and a dry component comprising $CaO$,$Al_2O_3$,$SiO_2$, and $Fe_2O_3$ in proportions adequate to allow working upon mixing of said binder and said aggregate and adequate to yield a rigid structure upon setting of said mixed binder and aggregate, wherein said $Fe_2O_3$ comprises approximately 1.0 percent by weight.]

[40. A binder useful for bonding aggregate into a rigid structure upon mixing and setting of said binder and said aggregate, said binder comprising:

an acidic phosphate-providing component, said component being in a liquid phase at ambient temperature and pressure and comprising $SO_4$; and a dry component comprising $CaO$,$Al_2O_3$,$SiO_2$, and $Fe_2O_3$ in proportions adequate to allow working upon mixing of said binder and said aggregate and adequate to yield a rigid structure upon setting of said mixed binder and aggregate.]

[41. A binder useful for bonding an aggregate into a rigid structure upon mixing and setting of said binder and said aggregate, said binder comprising:

an acidic phosphate-providing component, said component being in a liquid phase at ambient temperature and pressure, said phosphate-providing component having a specific gravity between approximately 1.14-1.71; and a dry component comprising $CaO$,$Al_2O_3$,$SiO_2$, and $Fe_2O_3$ in proportions adequate to allow working upon mixing of said binder and said aggregate and adequate to yield a rigid structure upon setting of said mixed binder and aggregate.]

*42. A method of forming a bonded aggregate structure, said method comprising:*

*admixing a wet or aqueous phosphate-providing component with a dry aggregate composition to form a mixture with an amount of free water between 5.51 and 9.55 total weight percent, said phosphate-providing component having a specific gravity between approximately 1.14-1.71, said dry aggregate composition containing an aggregate and a binder component, said binder component comprising $CaO$, $Al_2O_3$, $SiO_2$, $P_2O_5$, and $Fe_2O_3$ in proportions adequate to yield a mixture setting in 8 to 30 minutes at 70 degrees Fahrenheit, where $CaO$ and $P_2O_5$ are present in a weight ratio of 0.40-0.52:1; and*

*allowing said mixture to set.*

*43. The method of claim 42 wherein said wet or aqueous phosphate providing component is present from 10 to 30 total weight percent and the structure is a refractory.*

*44. The method of claim 42 wherein said wet or aqueous phosphate providing component is present from 30 to 60 total weight percent and further comprising expanding or pumping said admixture prior to set.*

*45. The method of claim 42, wherein phosphate-providing component comprises a phosphoric acid.*

*46. The method of claim 42, wherein phosphate-providing component comprises orthophosphoric acid.*

*47. The method of claim 42 further comprising applying said mixture into a mold during or after said admixing step in order to form a bonded aggregate structure.*

*48. The method of claim 47 further comprising removing said bonded aggregate structure from said mold after said setting step.*

*49. The method of claim 47, wherein said mold comprises a compound selected from the group consisting of steel, wood, foam, and plastic.*

*50. The method of claim 42 and further comprising applying said mixture onto a heat-containing vessel during or after said admixing step in order to line said vessel.*

*51. The method of claim 50, wherein the heat-containing vessel is an incinerator.*

*52. The method of claim 50, wherein the heat-containing vessel is a kiln.*

*53. The method of claim 50, wherein the heat-containing vessel is a cement kiln.*

*54. The method of claim 50, wherein the heat-containing vessel is a lime kiln.*

*55. The method of claim 50, wherein the heat-containing vessel is a kaolin kiln.*

*56. The method of claim 48, wherein the heat-containing vessel is a furnace.*

*57. The method of claim 56, wherein the furnace is a fluidized catalytic cracking unit.*

*58. The method of claim 56, wherein the furnace is a sulfur reactor.*

*59. The method of claim 56, wherein the furnace is an ethylene cracker.*

*60. The method of claim 56, wherein the furnace is a coke calciner.*

*61. The method of claim 42 further comprising applying said mixture into a vessel for containing an amorphous material during or after said admixing step in order to contain said amorphous material.*

*62. The method of claim 61, wherein said amorphous material comprises a molten metal.*

*63. The method of claim 62, wherein the metal comprises aluminum.*

*64. The method of claim 62, wherein the metal comprises steel.*

*65. The method of claim 62, wherein the metal comprises copper.*

*66. The method of claim 62, wherein the metal comprises iron.*

*67. The method of claim 57, wherein the metal comprises brass.*

*68. The method of claim 57, wherein the metal comprises bronze.*

*69. The method of claim 62, wherein the metal comprises magnesium.*

*70. The method of claim 62, wherein the metal comprises lead.*

*71. The method of claim 47, wherein the bonded aggregate structure is a burner tile or block.*

*72. The method of claim 47, wherein the bonded aggregate structure is a thermocouple sleeve.*

*73. The method of claim 47, wherein the bonded aggregate structure can convey a molten material therein.*

*74. A method for forming a bonded aggregate structure, said method comprising:*

*admixing a wet or aqueous phosphate-providing component with a dry aggregate composition to form a mixture with an amount of free water between 5.51 and 9.55 total weight percent, said phosphate-providing component having a specific gravity between approximately 1.14-1.71, said dry aggregate composition containing an aggregate and a binder component, said binder component comprising $CaO$, $Al_2O_3$, $SiO_2$, $P_2O_5$, and $Fe_2O_3$ in*

*proportions adequate to yield a settable mixture, where CaO and $P_2O_5$ are present in a weight ratio of 0.40-0.52:1;*

*allowing said mixture to set; and*

*exposing the structure to temperature between about 2200° F.-3400° F. without prior predrying or prefiring.*

*75. The method of claim 74, wherein phosphate-providing component comprises a phosphoric acid.*

*76. The method of claim 74, wherein phosphate-providing component comprises orthophosphoric acid.*

*77. The method of claim 74 further comprising applying said mixture into a mold during or after said admixing step in order to form a bonded aggregate structure.*

*78. The method of claim 77 further comprising removing said bonded aggregate structure from said mold after said setting step.*

*79. The method of claim 77, wherein said mold comprises a compound selected from the group consisting of steel, wood, foam, or plastic.*

*80. The method of claim 74 and further comprising applying said mixture onto a heat-containing vessel during or after said admixing step in order to line said vessel.*

*81. The method of claim 80, wherein the heat-containing vessel is an incinerator.*

*82. The method of claim 80, wherein the heat-containing vessel is a kiln.*

*83. The method of claim 80, wherein the heat-containing vessel is a cement kiln.*

*84. The method of claim 80, wherein the heat-containing vessel is a lime kiln.*

*85. The method of claim 80, wherein the heat-containing vessel is a kaolin kiln.*

*86. The method of claim 78, wherein the heat-containing vessel is a furnace.*

*87. The method of claim 86, wherein the furnace is a fluidized catalytic cracking unit.*

*88. The method of claim 86, wherein the furnace is a sulfur reactor.*

*89. The method of claim 86, wherein the furnace is an ethylene cracker.*

*90. The method of claim 86, wherein the furnace is a coke calciner.*

*91. The method of claim 74 further comprising applying said mixture into a vessel for containing an amorphous material during or after said admixing step in order to contain said amorphous material.*

*92. The method of claim 91, wherein said amorphous material comprises a molten metal.*

*93. The method of claim 92, wherein the metal comprises aluminum.*

*94. The method of claim 92, wherein the metal comprises steel.*

*95. The method of claim 92, wherein the metal comprises copper.*

*96. The method of claim 92, wherein the metal comprises iron.*

*97. The method of claim 87, wherein the metal comprises brass.*

*98. The method of claim 87, wherein the metal comprises bronze.*

*99. The method of claim 92, wherein the metal comprises magnesium.*

*100. The method of claim 92, wherein the metal comprises lead.*

*101. The method of claim 77, wherein the bonded aggregate structure is a burner tile or block.*

*102. The method of claim 77, wherein the bonded aggregate structure is a thermocouple sleeve.*

*103. The method of claim 77, wherein the bonded aggregate structure can convey a molten material therein.*

* * * * *